United States Patent Office 3,247,454
Patented Apr. 19, 1966

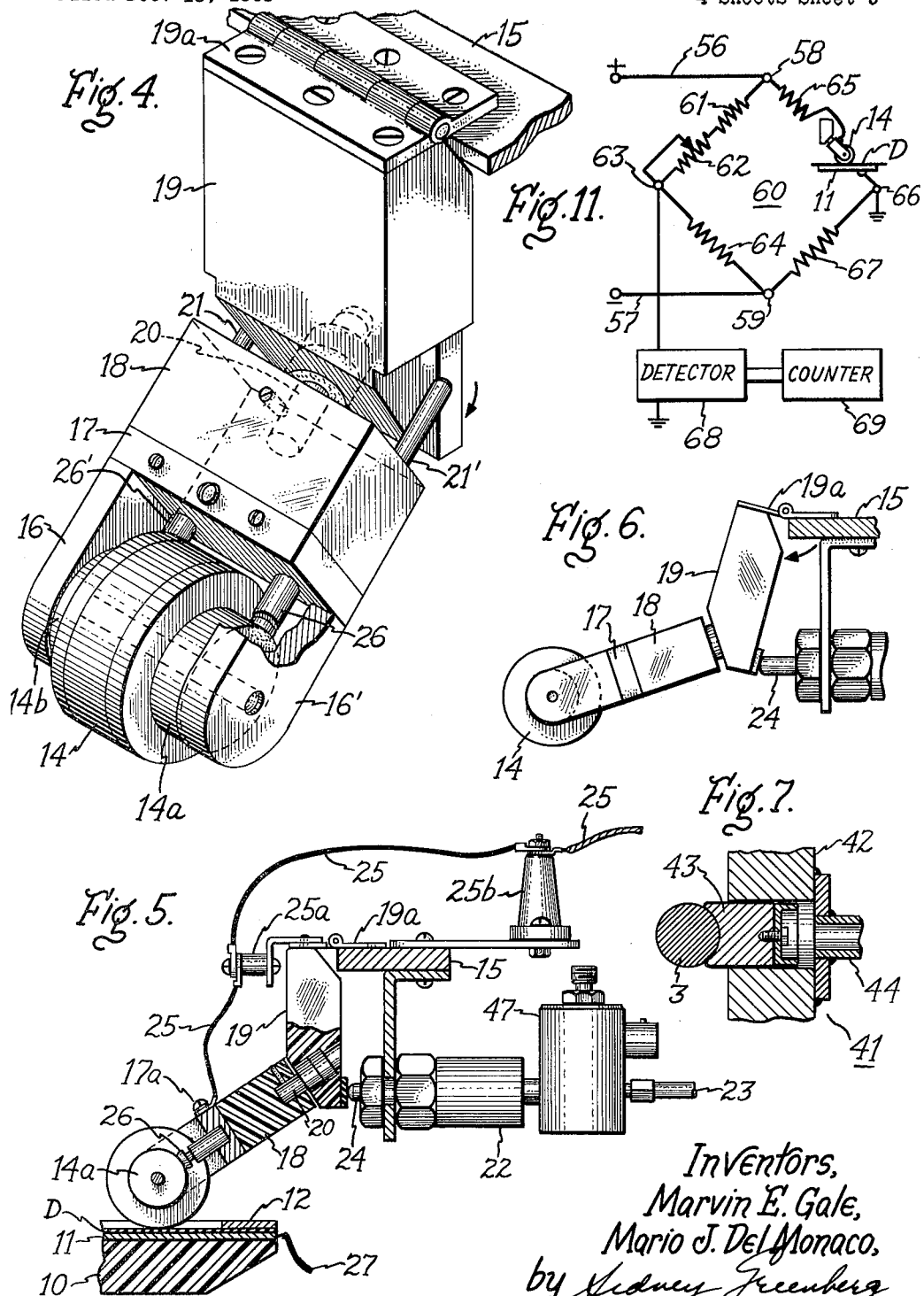

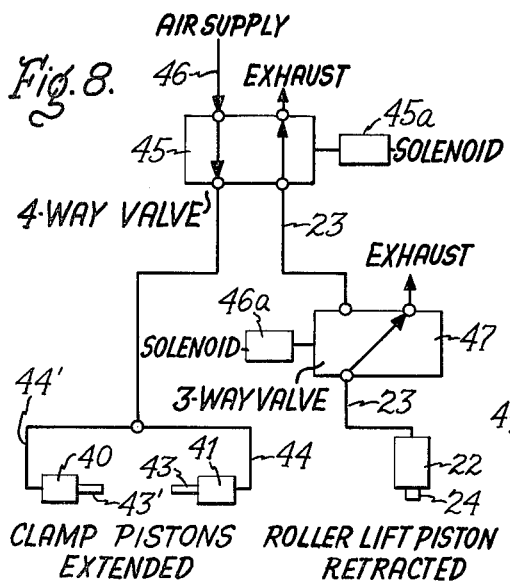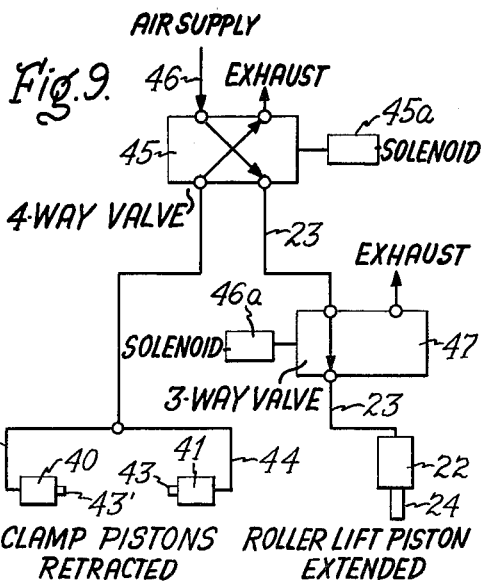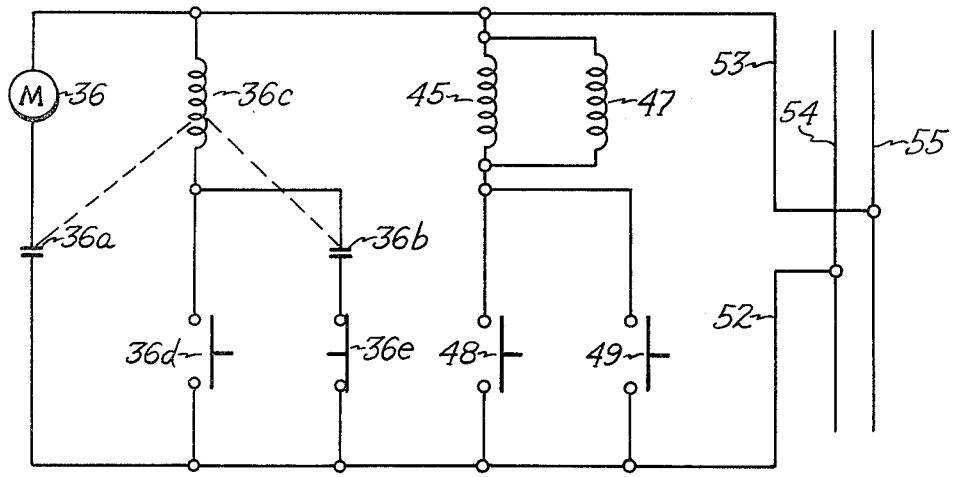

3,247,454
DIELECTRIC TESTING APPARATUS INCLUDING A MOVABLE TABLE FOLLOWING A PREDETERMINED PATH
Marvin E. Gale, Glens Falls, and Mario J. Del Monaco, Hudson Falls, N.Y., assignors to General Electric Company, a corporation of New York
Filed Dec. 15, 1961, Ser. No. 159,537
8 Claims. (Cl. 324—54)

The present invention relates to testing apparatus, and more particularly to apparatus for testing the quality of dielectric sheet materials, such as paper, plastic films, inorganic sheeting and the like.

The apparatus of the present invention is an improvement on the dielectric testing device disclosed in co-pending application Serial No. 166,442, Hall et al., filed November 3, 1961 (abandoned), and assigned to the same assignee as the present invention. The Hall et al. device includes a circuit arrangement for impressing a voltage through the dielectric sheet to be tested, by means of a conducting roller and a conducting plate between which the dielectric sheet is placed. The circuit arrangement is such that it detects and counts the number of the electrical paths in the dielectric sheet as the roller is moved over the sheet in rolling contact therewith. The roller in the Hall et al. device is moved by hand along regions of the sheet of predetermined area as the sheet remains in a stationary position on its conductive supporting plate. Such manual operation has a number of drawbacks, as, for example, the likelihood of unreliable counts due to variable rates and pressure with which the hand-operated roller is moved over the dielectric sheet, the excessive expense and time involved in hand operation, and the nonuniformity of testing where different operators are used.

It is an object of the invention to provide an improved dielectric testing apparatus of the described type which avoids the disadvantages of the previously known apparatus of this type.

It is another object of the invention to provide a dielectric testing apparatus which produces uniform test results and is economical in operation.

It is a further object of the invention to provide a testing apparatus which automatically and accurately tests the quality of dielectric sheets and makes possible improved determination of the utility of particular dielectric sheet material in electrical component applications.

Other objects and advantages will become apparent from the following description and the appended claims.

With the above objects in view, the present invention relates to an apparatus for testing the quality of dielectric sheet material which comprises stationary support means, movable table means mounted on the support means and adapted to carry thereon dielectric sheet material to be tested, driving means mounted on the support means and movable thereon in a predetermined path, the table means being connected to the driving means and adapted to be driven thereby along the predetermined path, and electrical means associated with the table means for testing the quality of dielectric sheet material adapted to rest thereon.

The invention will be better understood from the following description taken in conjunction with the accompanying drawings, in which:

FIGURE 4 is an enlarged perspective view of the contact roller arrangement of the testing apparatus;

FIGURE 5 is an elevational view, partly in section, of the contact roller arrangement shown in operative position;

FIGURE 6 is an elevational view of the contact roller shown in inoperative position;

FIGURE 7 is a fragmentary detailed view, partly in section, of the clamp mechanism for restricting lateral movement of the movable table of the apparatus;

FIGURES 8 and 9 are schematic showings of the air valve arrangements incorporated in the apparatus in their de-energized and energized conditions, respectively;

FIGURE 10 is a circuit diagram of the electrical circuit which may be employed in the apparatus of the invention; and FIGURE 11 is a simplified circuit diagram of the testing circuit which may be employed in conjunction with the present invention.

Figure 1:
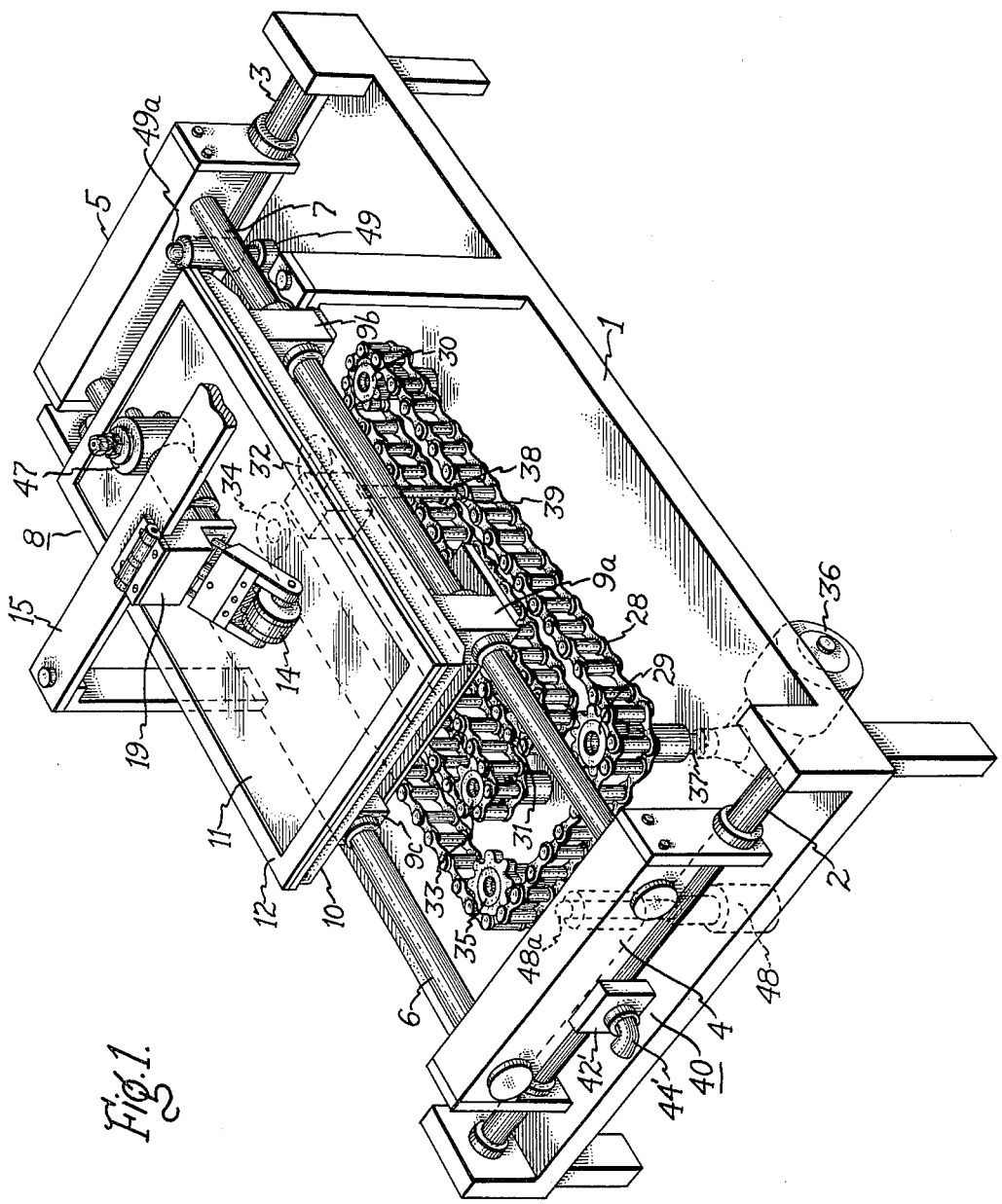
FIGURE 1 is a perspective view of the automatic testing apparatus of the present invention.
Figure 3:
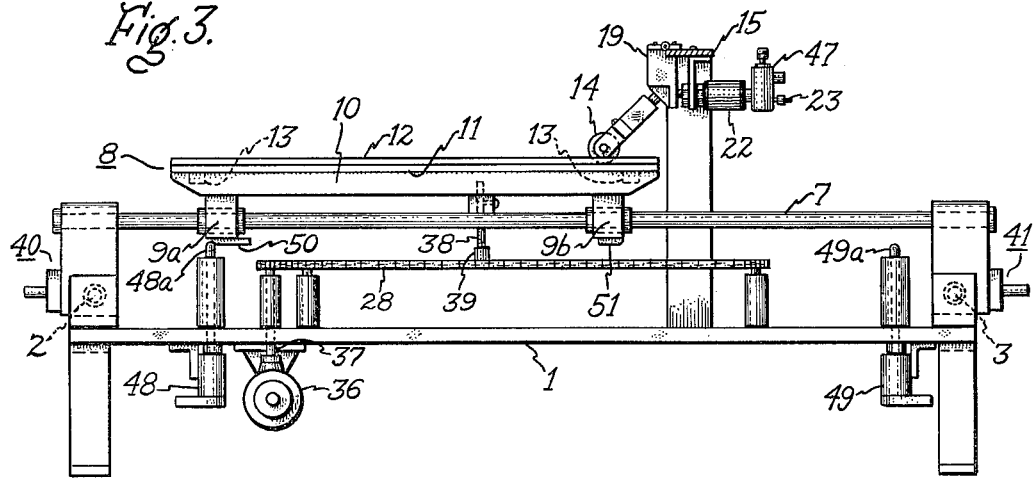
FIGURE 3 is an elevational view of the apparatus shown in FIGURE 2.

Referring now to the drawings, and particularly to FIGURE 1, the testing apparatus comprises a stationary base 1 having stationary lateral rods 2 and 3 fixed thereto at opposite ends. Mounted for sliding lateral movement on rods 2 and 3 are blocks 4 and 5, respectively, to which are fixed at opposite ends longitudinal rods 6 and 7 extending at right angles to lateral rods 2 and 3. Mounted for sliding longitudinal movement on rods 6 and 7 is carriage 8 which comprises four bearings 9a, 9b, 9c, and 9d at the corners of carriage 8 riding on rods 6 and 7, and a table assembly (see FIGS. 1 and 5) comprising insulating plate 10, conducting plate 11 (e.g., made of brass), steel frame 12, and magnets 13 (see FIG. 3) embedded at the corners of plate 10 for firmly holding frame 12 in position. The dielectric sheet D to be tested is arranged between frame 12 and conducting plate 11 (see FIG. 5).

By virtue of the above arrangement, carriage 8 is movable both longitudinally and laterally on base 1.

Conducting roller 14, which in conjunction with conducting plate 11, serves to impress a voltage through dielectric sheet D, as hereinafter being more fully explained, is secured to bracket 15 which is fixed to base 1 so as to straddle the table assembly above carriage 8, roller 14 being arranged for rolling contact with dielectric sheet D as carriage 8 moves along rods 6 and 7. As will be seen, roller 14 is positioned about midway between the limits of longitudinal movement of carriage 8 so that it will come into contact with almost the entire length of the dielectric sheet, the latter normally being substantially co-extensive with conducting plate 11.

As seen in detail in FIGURE 4, roller 14, which may be made of brass or other suitable conducting material, is rotatably mounted between metal arms 16 and 16' projecting from metal plate 17 fixed to insulating block 18. The latter is connected to an insulating support member 19 which in turn is hingedly secured to main bracket 15 by hinge 19a so that the entire roller assembly described is movable toward and away from the table carrying the dielectric sheet. To ensure that roller 14 maintains full contact within the dielectric sheet during the testing operation, insulating block 18 is secured to insulating support member 19 by a pivot joint 20 which permits insulating block 18 and associated parts to pivot about an axis perpendicular to the axis of rotation of roller 14. Dowell pins 21 and 21′ are provided projecting rearwardly from block 18 for keeping the pivot motion of block 18 within desired limits, by virtue of the dowel pins respectively striking supporting member 19 after a certain extent of such pivoting motion.

Automatic lifting and lowering of roller 14 about hinge 19a is achieved by pneumatic actuating actuating means 22, including air supply conduit 23 and piston 24, which is operative for alternately extending and retracting piston 24 for respectively raising and dropping the roller assembly. In FIGURE 5 the roller assembly is shown in lower, operative position in contact with dielectric sheet D, and in FIGURE 6 the roller assembly is shown in raised, inoperative position with piston 24 in extended position bearing against support member 19.

With roller 14 in contact with dielectric sheet D, carriage 8 is moved relative to roller 14 by means hereinafter more fully described. During such movement a voltage is impressed through dielectric sheet D between roller 14 and underlying conducting plate 11, and electrical paths in the sheet are detected by an electrical circuit arrangement such as shown and described in the aforementioned Hall et al. application, which is incorporated by reference herein.

FIGURE 11 illustrates a simplified circuit diagram representing the Hall et al. testing device, and as shown therein the circuit comprises a pair of leads 56 and 57 by means of which a direct current voltage is impressed across opposite corners 58 and 59 of a bridge circuit 60. The left-hand side of the bridge contains a fixed resistor 61 in series with a variable resistor 62 connected between the top corner 58 and null point corner 63 of the bridge, and a fixed resistor 64 connected between the corners 59 and 63. The right-hand side of the bridge consists of a fixed resistor 65 in series with an "unknown resistance" connected between the corner 58 and the other null point corner 66, and a fixed resistor 67 between the corners 59 and 66. The unknown resistance corresponds to the resistance of an electrical path through one or more sample sheets of dielectric material D disposed between conducting roller 14 and conducting plate 11. A detecting circuit 68 is connected across the corners 63 and 66 of bridge circuit 60 and a counter 69 is energized by the detecting circuit.

As shown in FIGURE 5, electrical connection to roller 14 is made by lead 25 connected at one end to conducting plate 17 by a terminal stud 17a and at the other end to the bridge circuit as above-described, lead wire 25 being mounted on bracket 15 by means of stand-off insulators 25a and 25b. Electrical connection is made to conducting roller 14 by spring-loaded conducting pins 26, 26′ mounted in conducting plate 17 and yieldably bearing against hubs 14a, 14b of roller 14. Conducting plate 11 underneath electric sheet D is connected to the testing bridge circuit as above-described by lead 27 to complete the circuit.

Figure 2:
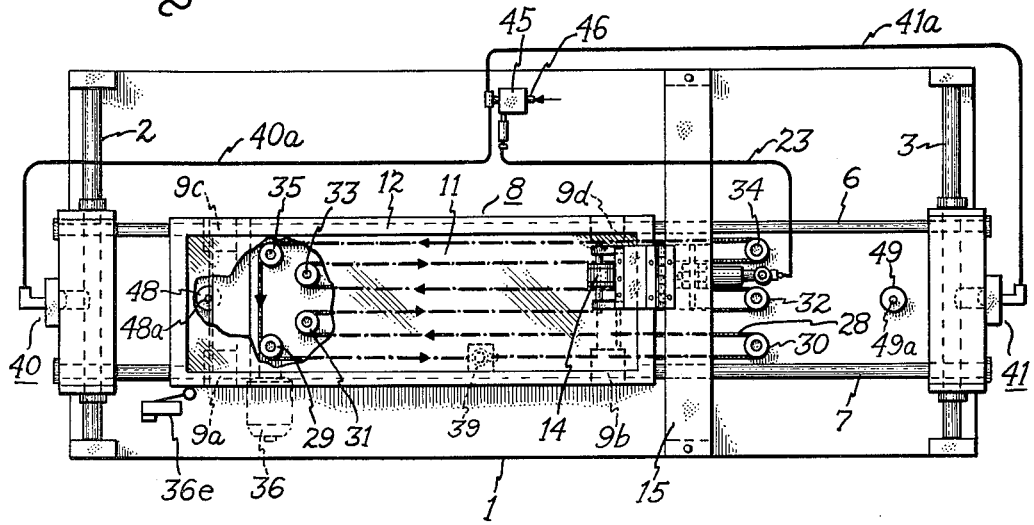
FIGURE 2 is a partly schematic plan view of the testing apparatus of the invention.

In accordance with the invention, means are provided for driving carriage 8 with dielectric sheet D thereon in a predetermined continuous pattern or closed path relative to roller 14. Preferably the path is such that roller 14 rolls along dielectric sheet D in a plurality of parallel runs along the length of the sheet with no appreciable overlapping or gaps between adjacent runs. An embodiment of the invention by which this may be achieved is shown in the drawings. As shown in FIGURES 1 and 2, the carriage driving means comprises endless chain 28 mounted below the table assembly for continuous horizontal movement in the above-described continuous predetermined path. In this path, chain 28 engages seven sprocket wheels 29–35, inclusive, secured to base 1 in the arrangement as best seen in FIGURE 2. Chain 28 is driven by motor 36 secured to the underside of base 1 which rotates spindle 37 connected to driving sprocket wheel 29, the latter in turn imparting a driving motion to chain 28.

Chain 28 is operatively connected to carriage 8 by means of pin 38 which is fixedly secured at its upper end to the bottom of carriage 8 and has its lower end freely extending into socket 39 which is secured to one of the links of chain 28. Socket 39 has a slightly larger diameter than pin 38 so that the latter readily fits into and is free to rotate therein.

By virtue of the construction thus far described, it is apparent that by operation of motor 36, carriage 8 will move in a series of six parallel longitudinal runs along base 1 as shown by the arrows in FIGURE 2 while shifting slightly laterally at the end of each run before beginning the return run as its connecting pin 38 moves with the chain around each sprocket wheel, and at the end of the final parallel run will move laterally across base 1 to return to the starting position. The lateral spacing of sprocket wheels 29–35 at the ends of the run, and consequently the extent of the lateral shifting of the carriage after reaching the end of each run, is coordinated with the width of roller 14 which is in contact with dielectric sheet D so as to avoid appreciable overlapping between adjacent strips of the dielectric sheet which are tested by successive runs of roller 14 thereon. In other words, the center lines of the longitudinal paths which chain 28 follows are spaced a distance at least equal to the width of the roller 14. The sprocket wheel arrangement is preferably such that the longitudinal carriage movement is perpendicular to the rolling axis of roller 14 to avoid sideways slippage of the latter on the sheet being tested. It will be understood, of course, that the spacing of the sprocket wheels at one end of base 1 from those at the opposite end is sufficient to provide for roller 14 to come into contact with the desired limits of the dielectric sheet area to be tested.

To ensure that the longitudinal test runs of carriage 8 are straight, means are provided in accordance with the invention to prevent lateral movement of carriage 8 during the test runs. For this purpose, pneumatically-operated clamps 40 and 41 are arranged on opposite guide blocks 4 and 5 for gripping respective lateral rods 2 and 3 during the longitudinal test runs of carriage 8, and thereby locking guide blocks 4 and 5 against lateral movement. As shown in FIGURE 7 which illustrates only clamp 41, the clamp arrangement comprises housing 42 which is secured to block 5 and has slidable piston 43 therein with curved contact face for movement toward and away from lateral rod 3. Air supply conduit 44 provides air under pressure to housing 42 and serves alternately to actuate and release piston 43 in the manner hereinafter explained. As will be understood, clamp 40 at the other end has a similar construction and operation, as indicated by parts 42′ and 44′ in FIG. 1.

As already described, pneumatic means are provided for raising and lowering roller 14 with respect to dielectric sheet D. To avoid the risk of tearing or otherwise disturbing the dielectric sheet during lateral movement of carriage 8, means are provided in accordance with the invention for automatically raising roller 14 at the end of each longitudinal test run until the carriage is in position to start the next test run and for releasing clamps 40, 41 during the same interval of time to permit the necessary lateral shifting of carriage 8. The mechanism employed for this purpose, as shown in FIGURES 2, 8, and 9, comprises an electrically actuated 4-way valve device 45 which has an air supply conduit 46 connected thereto. Valve device 45 which communicates with clamps 40, 41 is operative when actuated to deliver air under pressure simultaneously to both clamps. Valve device 45 also communicates with pneumatic actuating means 22, and the arrangement is such that when air is being supplied to clamps 40, 41, air is exhausted from actuating means 22. Under these conditions, carriage 8 is locked against lateral movement while at the same time roller 14 is in lowered operating position as shown in FIGURE 5. On the other hand, when valve device 45 is not actuated, air is exhausted from clamps 40, 41 whereas air is supplied to pneumatic actuating means 22, and under these conditions, carriage 8 is free to move laterally while at the same time roller 14 is in raised inoperative position as shown in FIGURE 6. In order to facilitate the exhaust of air from pneumatic lifting device 22, electrically-actuated 3-way valve 47 is preferably inserted in air conduit 23 adjacent roller-lifting device 22. The arrangement of valve 47 is such that when air is being delivered to lifting device 22 from main valve 45, the air is permitted to pass through valve 47 to lifting device 22, but when valve 45 is being actuated so as to exhaust air from lifting device 22, valve 47 provides a by-pass exhaust for the air coming from lifting device 22. In this way, roller 14 is lowered into operating position without as much delay as would occur if the air had to return all the way to main valve device 45 to be exhausted. However, it will be understood that 3-way valve device 47 is not absolutely necessary and may be dispensed with, if desired.

FIGURES 8 and 9 show in diagrammatic form the arrangement and operation of the pneumatic clamping and lifting mechanism just described, FIGURE 8 showing the operation when main valve 45 is de-energized, and FIGURE 9 showing the operation when main valve 45 is energized. As illustrated in FIGURE 8, when solenoid 45a of main valve 45 is de-energized, air under pressure passes through valve 45 to clamps 40, 41, so as to extend the clamp pistons into engagement with the respective lateral rods 2 and 3. Air is exhausted from lift device 22 during this stage both through valve 45 and valve 47 as shown by the arrows, and roller lifting piston 24 is retracted.

As illustrated in FIGURE 9, when solenoid 45a is energized, air is exhausted from clamps 40, 41 through 4-way valve 45 as indicated by the arrow. At the same time, air under pressure passes through valve 45 to lift device 22 via 3-way valve 47, to extend roller lifting piston 24.

The 4-way and 3-way valves above-described and represented in the drawing are of conventional type and well-known construction, and are readily commercially available. For example, suitable valves of this type are marketed by Automatic Switch Company, Orange, New Jersey, under the designation "Bulletin 8345" for 4-way valves, and "Bulletin 8316" for 3-way valves.

In order to provide for automatic operation of the pneumatic valves as above-described during the testing procedure, electrical switches 48 and 49 electrically connected to the solenoids of valves 45 and 47 are arranged at opposite ends of stationary base 1, and have actuating buttons 48a, 49a. The latter buttons are in position to be depressed by plates 50 and 51, respectively, affixed to and extending between bearings 9a, 9c at one end and bearings 9b, 9d at the other, the plates being suitably beveled at their leading edges which come into contact with the switch buttons so as to ride over and depress the latter. The length of plates 50 and 51 extends the entire width of conducting plate 11 and their width is sufficient to keep switch buttons 48a, 49a, respectively, depressed long enough to permit pin 38 to ride around each sprocket wheel in shifting carriage 8 from the end of one test run to the beginning of the next test run.

As shown in FIGURE 2, stop switch 36e connected to motor 36 is arranged on base 1 in position to be actuated by carriage 8 as the latter returns to its starting position after the final test run, so that the motor and, consequently, further movement of the carriage is automatically stopped after the full testing cycle is completed. A showing of switch 36e is omitted from FIGURES 1 and 3 for the sake of clarity.

FIGURE 10 is a circuit diagram illustrating the electrical connection between the parts of the described device. As shown, the circuit comprises motor 36 having a relay in its circuit comprising relay contacts 36a and 36b, and relay coil 36c. Relay contact 36a is shown in series with motor 36, with push button 36d and relay coil 36c being connected across motor 36 and relay contact 36a. Connected across push button 36d are relay contact 36b and stop switch 36e. By virtue of this arrangement, when push button 36d is pressed, relay coil 36c becomes energized, closing relay contacts 36a and 36b, thus actuating motor 36 for moving carriage 8 through its test cycle. At the end of the test cycle, carriage 8 comes into contact with and opens stop switch 36e, thus de-energizing relay coil 36c, opening relay contacts 36a and 36b, and stopping motor 36.

Connected to the above circuit are switches 48 and 49 arranged in parallel, the switches being in series with parallel-connected 4-way pneumatic valve 45 and 3-way pneumatic valve 37. During operation of motor 36, carriage 8 alternately actuates switches 48 and 49 at the ends of its longitudinal test runs, thus actuating both valves 45 and 47 in the manner previously described, and when carriage 8 rides off each switch 48, 49, valves 45 and 47 are returned to their former condition, also as described previously.

As shown, terminals 52 and 53 of the described circuit are connected to A.C. supply leads 54 and 55.

As will be evident to those skilled in the art, various modifications may be made in the construction described and shown without going beyond the scope of the invention. For example, instead of using a clamping arrangement for holding carriage 8 against lateral movement, a track or guide member (not shown) may be suitably incorporated in the device cooperating with pin 38 or some other part of carriage 8 to maintain the latter in a straight path during its longitudinal test runs. Other modifications within the scope of the invention will also readily occur to those skilled in the art. Accordingly, the appended claims are intended to cover all such equivalent variations as come within the true spirit and scope of the invention.

What we claim as new and desire to secure by Letters Patent of the United States is:

1. Apparatus for testing the quality of dielectric sheet material comprising in combination,
   (a) stationary support means,
   (b) a movable table mounted on said support means and adapted to carry thereon dielectric sheet material to be tested,
   (c) driving means mounted on said support means and movable thereon in a predetermined path,
   (d) said table being connected to said driving means for translation therewith along said predetermined path,
   (e) electrical testing means comprising,
      (1) a conducting plate mounted on said table,
      (2) a conducting roller mounted on said support means for rollably contacting the dielectric sheet material during translation of said table in the predetermined path, and
      (3) an electric testing circuit connecting said roller and said conducting plate for testing the quality of the dielectric sheet material.

2. Apparatus for testing the quality of dielectric sheet material comprising in combination,
   (a) stationary support means,
   (b) a movable table mounted on said support means and adapted to carry thereon dielectric sheet material to be tested,
   (c) driving means mounted on said support means and movable thereon in a predetermined path extending in longitudinal and transverse directions relative to said support means,
   (d) said table being connected to said driving means for translation therewith along said predetermined path,
(e) electrical testing means comprising,
(1) a conducting plate mounted on said table,
(2) a conducting roller mounted on said support means for rollably contacting the dielectric sheet material during translation of said table in the predetermined path, and
(3) an electric testing circuit connecting said roller and said conducting plate for testing the quality of the dielectric sheet material.

3. Apparatus for testing the quality of dielectric sheet material comprising in combination,
(a) stationary support means,
(b) a movable table mounted on said support means and adapted to carry thereon dielectric sheet material to be tested,
(c) driving means mounted on said support means and movable thereon in a predetermined path extending in longitudinal and transverse directions relative to said support means.
(d) said table being connected to said driving means for translation therewith along said predetermined path,
(e) means holding said table against transverse movement during its translation in the longitudinal direction of the predetermined path,
(f) electrical testing means comprising,
(1) a conducting plate mounted on said table,
(2) a conducting roller mounted on said support means for rollably contacting the dielectric sheet material during translation of said table in the predetermined path,
(3) an electric testing circuit connecting said roller and said conducting plate for testing the quality of the dielectric sheet material, and
(g) means for moving said roller out of contact with the dielectric material during transverse movement of said table means.

4. Apparatus for testing the quality of dielectric sheet material comprising in combination,
(a) stationary support means,
(b) a movable table mounted on said support means and adapted to carry thereon dielectric sheet material to be tested,
(c) driving means mounted on said support means and movable thereon in a predetermined path extending in longitudinal and transverse directions relative to said support means,
(d) said table being connected to said driving means for translation therewith along said predetermined path,
(e) means holding said table against transverse movement during its translation in the longitudinal direction of the predetermined path,
(f) electrical testing means comprising,
(1) a conducting plate mounted on said table,
(2) a conducting roller mounted on said support means for rollably contacting the dielectric sheet material during translation of said table in the predetermined path,
(3) and an electric testing circuit connecting said roller and said conducting plate for testing the quality of the dielectric sheet material,
(g) means for moving said roller out of contact with the dielectric material during transverse movement of said table means,
(h) means for releasing said holding means to permit movement of said table means in the transverse direction while simultaneously moving said roller out of contact with the dielectric material during movement of said table in the transverse direction.

5. Apparatus for testing the quality of dielectric material comprising in combination,
(a) stationary support means,
(b) a movable table mounted on said support means and adapted to carry thereon the dielectric sheet material to be tested,
(c) driving means comprising an endless chain mounted on said support means and movable thereon in a continuous predetermined path,
(d) said table being connected to said driving means for translation therewith along said predetermined path,
(e) an electrical testing means comprising,
(1) a conducting plate mounted on said table,
(2) a conducting roller mounted on said support means for rollably contacting the dielectric sheet material during translation of said table in the predetermined path, and
(3) an electric testing circuit connecting said roller and said conducting plate for testing the quality of the dielectric sheet material.

6. Apparatus for testing the quality of dielectric sheet material comprising in combination,
(a) stationary support means,
(b) a movable table mounted on said support means and adapted to carry thereon the dielectric sheet material to be tested,
(c) driving means comprising an endless chain mounted on said support means and movable thereon in a continuous predetermined path,
(d) a pin connected to said table,
(e) a socket connected to said endless chain, the free end of said pin being freely received in said socket, said pin and said socket co-acting upon movement of said endless chain to drive said table along the continuous predetermined path,
(f) an electrical testing means comprising,
(1) a conducting plate mounted on said table,
(2) a conducting roller mounted on said support means for rollably contacting the dielectric sheet material during translation of said table in the predetermined path,
(3) and an electric testing circuit connecting said roller and said conducting plate for testing the quality of the dielectric sheet material.

7. Apparatus for testing the quality of dielectric sheet material comprising in combination,
(a) stationary support means,
(b) a movable table mounted on said support means and adapted to carry thereon dielectric sheet material to be tested,
(c) driving means mounted on said support means and movable thereon in a predetermined path extending in longitudinal and transverse directions relative to said support means,
(d) said table being connected to said driving means for translation therewith along said predetermined path,
(e) means holding said table against transverse movement during its translation in the longitudinal direction of the predetermined path,
(f) electrical testing means comprising,
(1) a conducting plate mounted on said table,
(2) a conducting roller mounted on said support means for rollably contacting the dielectric sheet material during translation of said table in the predetermined path,
(3) an electric testing circuit connecting said roller and said conducting plate for testing the quality of the dielectric sheet material,
(g) automatic means for permitting movement of said table in the transverse direction of the predetermined path while simultaneously moving said roller out of contact with the dielectric material, said automatic means comprising,
(1) an electrically-actuated fluid-pressure means for operating said holding means and said means for moving said roller, and (2) a switch operable by said table at the end of its movement in the longitudinal direction of the predetermined path for actuating said fluid-pressure means.

8. Apparatus as defined in claim 7, wherein the longitudinal portions of the path are parallel to one another with their center lines spaced a distance at least equal to the width of the roller in contact with the dielectric sheet material.

References Cited by the Examiner

UNITED STATES PATENTS

| | | | |
|---|---|---|---|
| 1,077,815 | 11/1913 | Droitcour | 74—37 |
| 1,978,886 | 10/1934 | Schramm | 74—37 |
| 2,553,391 | 5/1951 | Tyler | 73—71.6 |
| 2,605,841 | 8/1952 | Overman | 74—37 |
| 2,649,000 | 8/1953 | Bice | 77—64 |
| 2,873,425 | 2/1959 | Huggins | 324—54 |
| 3,037,163 | 5/1962 | Wiprud | 324—54 |

FREDERICK M. STRADER, *Primary Examiner.*

WALTER L. CARLSON, *Examiner.*